June 15, 1965 R. E. WILLIAMS ETAL 3,189,109
WEIGHT COMPENSATING SYSTEM FOR AUTOMATIC NET WEIGHERS
Filed Aug. 22, 1962 3 Sheets-Sheet 1

Inventors
Ralph E. Williams
Leon J. Nowak, Jr.
by Parker & Carter
Attorneys

Inventors
Ralph E. Williams
Leon J. Nowak, Jr.

by Parker & Carter
Attorneys

3,189,109
WEIGHT COMPENSATING SYSTEM FOR AUTOMATIC NET WEIGHERS

Ralph E. Williams, La Grange, and Leon J. Nowak, Jr., Park Ridge, Ill., assignors, by mesne assignments, to Blaw-Knox Company, Pittsburgh, Pa., a corporation of Delaware Filed Aug. 22, 1962, Ser. No. 218,736
8 Claims. (Cl. 177—68)

This invention relates to automatic net weighing machines of the type wherein a material holding weigh bucket is supported at one end of a scale beam which is equipped to support weights or weight adjustment means at the other end, and a controlled flow of material to be weighed is delivered to the weigh bucket from a supply hopper in an automatic start and stop sequence.

In automatic net weighing machines of the type referred to the flow of material to the bucket is automatically interrupted or terminated when the bucket has a predetermined weight of material therein, which weight of material moves the bucket downwardly and actuates some mechanism for diverting or terminating the flow of material to the bucket. One disadvantage in the operation of such net weighing machines is found in the fact that a certain amount of material is delivered to the weigh bucket after the bucket has started its downward movement and after the hopper delivering material to the bucket has been closed. This material is "in flight" or suspension at the time the bucket moves downwardly and the hopper, or feeding chute, is closed. The result is that the weighed material in the bucket exceeds the poise or weight setting of the beam by the weight of material in suspension. This amount in suspension varies, depending on the rate of flow of material, and is an unknown quantity. Usually, when changing speed of operation or weights a series of test weights must be taken, and weight adjustment made by trial and error until the desired weight of material is obtained, and the proper setting known. Thus, it is difficult to set one of these weighing machines to deliver the exact and accurate weight of material desired.

A major purpose of the present invention is to overcome the aforementioned disadvantage and permit an automatic net weighing machine to be quickly and accurately set to deliver any desired weight of material within its capacity range per discharge from the bucket.

Another purpose of the present invention is the provision of a system which makes it possible to check-weigh a predetermined mass of material in the weigh hopper of an automatic net weighing machine, and without resetting the regular weight or poise setting, a process that up until this development has required checking for accuracy of the material weight on a separate check weighing balance, or by moving and consequently disturbing the weight setting poise or weight.

Other objects and purposes will appear from time to time in the course of the ensuing specification and claims.

Referring generally now to the drawings.

Like elements are designated by like characters throughout the specification and drawings.

Figure 1:
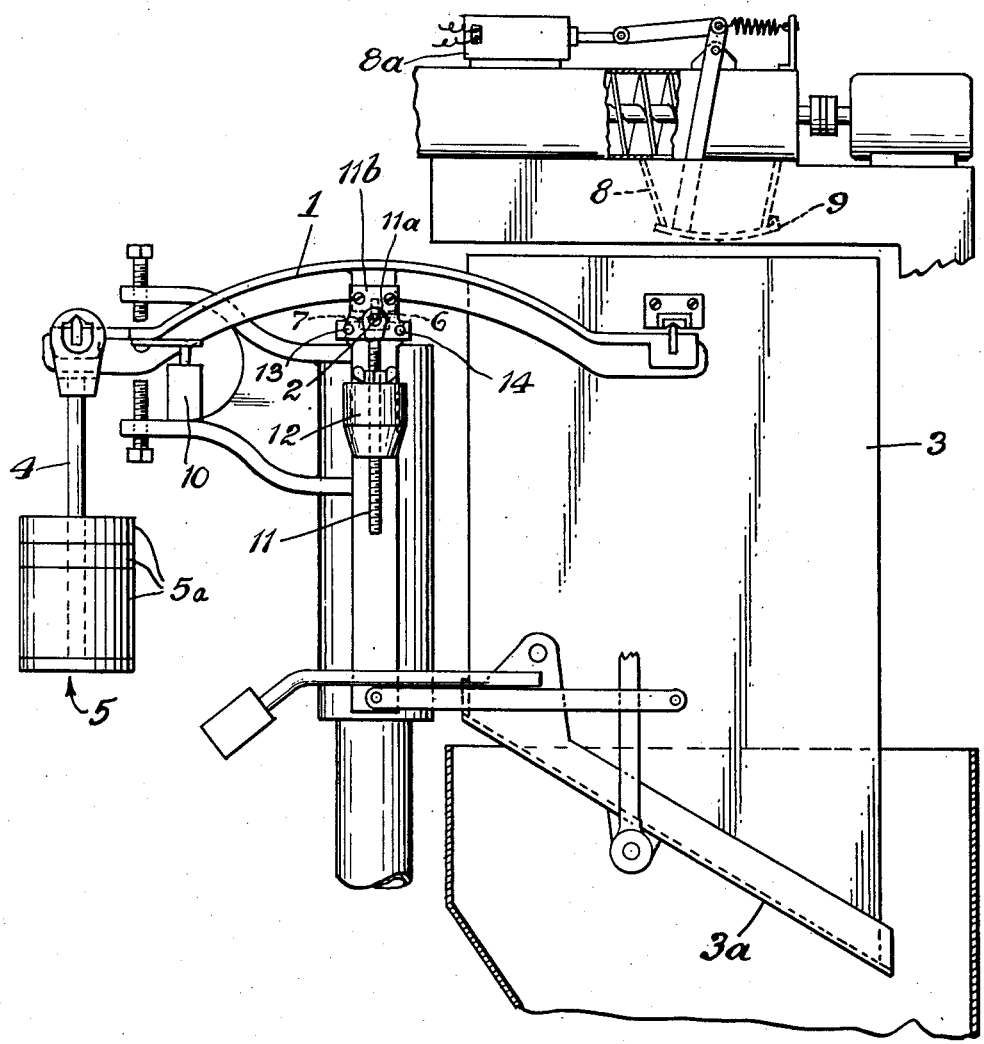
FIGURE 1 is a side elevation view of the improved system constituting the present invention.
Figure 2:
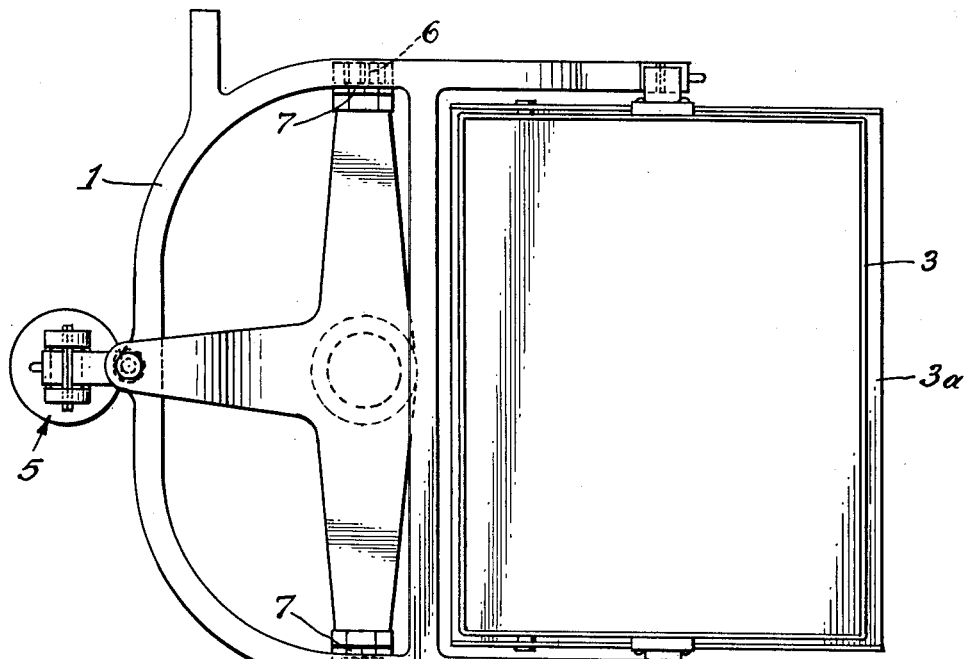
FIGURE 2 is a plan view of the apparatus shown in FIGURE 1.

Referring specifically now to the drawings and in the first instance to FIGURE 1, numeral 1 represents a typical weigh beam which is supported intermediate its ends on a fulcrum 2. The weigh beam 1 supports a weigh bucket 3 at one end thereof and at the other end thereof supports a counterweight rod 4 and counterbalance 5 of sufficient weight to balance the beam with empty weight bucket and with which may be associated weights 5a of a predetermined desired magnitude for balancing the weight of the bucket 3 with the desired load therein. It should be understood that when the weigh bucket 3 is empty and weights 5a are removed the weigher is in even balance. The weigh bucket has a bottom closure 3a, which, when open, allows flow of material from the bucket. The weigh beam may be fulcrumed as by means of a pivot bar 6 having a knife edge resting in pivot blocks 7 supported on the base of the machine.

In apparatus of this type, a material delivery chute 8 is employed to deliver a stream of material to the bucket 3 in automatic timed sequence. The chute 8 may lead from any suitable feeder which is located below a supply hopper. The feeder may provide either a gravity or a power feed flow. The chute has a closure, diagrammatically represented at 9, for closing the chute and thereby terminating the flow of material to the bucket 3. In this type of automatic weighing machine, some mechanism, such as a switch 10 is associated with the weigh beam so as to actuate when the bucket end of the weigh beam moves downwardly in response to a predetermined weight of material in the bucket. The switch mechanism may, for example, actuate a solenoid 8a for moving the feed gate cut-off 9 to the closed position, in which position it is shown in dotted lines in FIGURE 1.

Figure 3:
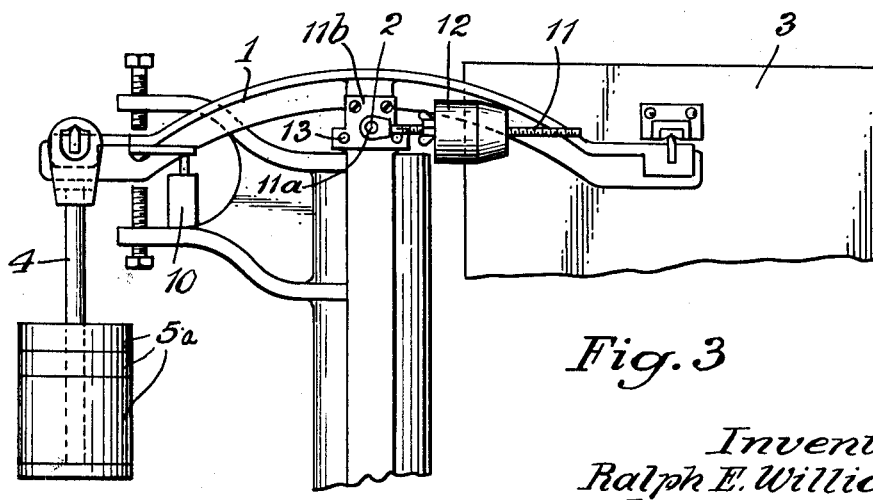
FIGURE 3 is a view similar to FIGURE 1 but illustrating another operative position of the elements in FIGURE 1.
Figure 4:
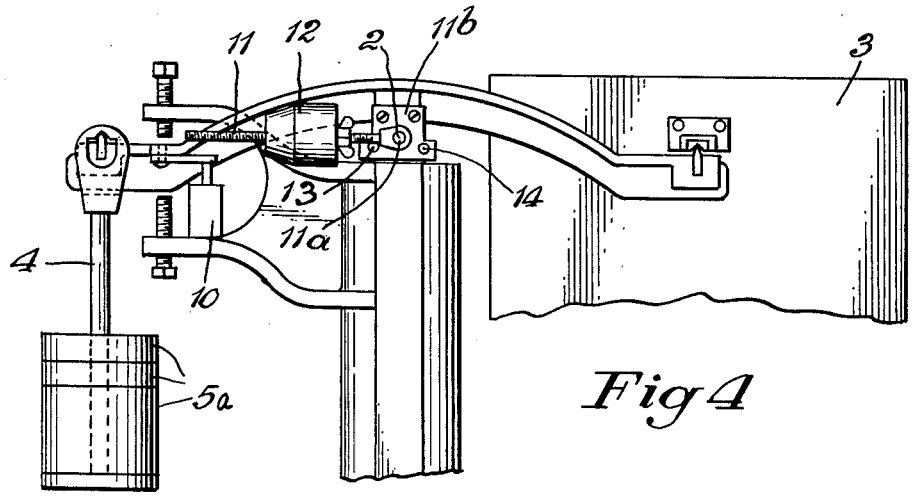
FIGURE 4 is still another view similar to FIGURE 1 but illustrating a still further operative position of the elements of FIGURE 1.

According to the invention an auxiliary counter-poise rod is associated with the pivot 6 of the weigh beam. The rod is illustrated at 11 and is shown as pivotally mounted upon a pin 11a on a bracket 11b in precise and centered alignment with the pivot bar 6 of the weigh beam. It is also axially movable along the pin 11a. The pin 11a is coaxial with the pivot 6. When the counterpoise rod 11 is freely suspended upon the pin 11a it depends therefrom as shown in FIGURE 1, and does not exert force on either side of the beam from fulcrum 2— in other words, zero force. An adjustable weight 12 is positioned on the bar and may be screw threaded thereon so as to enable adjustment of the weight along the length of the rod 11. Any suitable locking mechanism, such as a thumbscrew, may be used to maintain the weigh 12 in any desired location along rod 11. Stops or retaining members 13 and 14 are positioned on each side of the fulcrum 2 and on the bracket 11b so that the auxiliary counterpoise rod 11 may be swung (clockwise or counterclockwise) to either side of the fulcrum 2 and held in either of the positions shown in FIGURE 3 and FIGURE 4. It is simply swung to a generally horizontal position and then moved axially along the pivot pin to a point where the rod 11 may rest on one of the stops 13 or 14. Thus the counterpoise weight associated with the rod 11 may be selectively positioned so that it is added to the weight of the bucket 3 and material therein, or added to the weight of the counterpoise weight 5.

Whereas we have shown and described operative forms of the invention, it should be understood that these showings are taken in an illustrative or diagrammatic sense only. There are modifications to the invention which fall within the scope and spirit thereof and which will be apparent to those skilled in the art. The scope of the invention should be limited only by the scope of the hereinafter appended claims.

The use and operation of the invention are as follows:

The invention contemplates use of a typical net weighing machine in which the flow of material to the weigh bucket 3 is automatically terminated when a predetermined weight of the delivered load is in the bucket and the weigh bucket has moved downwardly in response to such a load. A machine of this class may be set to deliver any desired load by selecting a counterpoise weight of the proper magnitude to counterbalance the weight of the bucket and the load therein.

In this class of apparatus, however, the weigh bucket moves downwardly as soon as the load actually in the bucket, together with the weight of the bucket, is equal to the force created by the counterpoise weights 5a. The feed gate 9 is then closed but there is still an unknown mass of material in flight or suspension between the feed gate 9 and the weigh bucket 3. Thus the weight of the material actually in the bucket after the flow of material has been terminated will exceed the weight of the counterpoise by an amount equal to the weight of this material in flight.

In order to enable the operator of the machine to quickly and accurately determine the exact amount of material that is delivered to the weigh bucket 3 during any operation, the operator first selects a counterpoise weight 5 of a magnitude equivalent to the weight of material actually desired in the bucket. The operator then starts the machine and the weigh beam automatically terminates the flow of material to the bucket just as soon as the mass of material in the bucket is sufficient to cause the bucket to move downwardly. The operator then positions the auxiliary counterpoise weight 12 on that side of the weigh beam pivot which will add to the biasing force provided by the main counterpoise 5. In the form of the invention shown in FIGURES 1 through 4, the weight is simply rotated until it moves outwardly to a position where the combined biasing force of the main counterpoise and the auxiliary weight will balance the bucket. The auxiliary weight rod is then moved axially along the pin 11a until it clears the holding member 13 and it is then swung to the other side of the pivot where such weight is then added to the biasing force produced by the material in the bucket. After it is swung to this position, the rod is again moved axially along the pin 11a until the rod may rest on the holding member 14. The mass of material in the bucket is then dumped. The operator then re-initiates operation of the machine and, during this second and subsequent weighings, the auxiliary weight added to the weight of material in the bucket will cause the bucket to move downwardly and thus terminate the flow of material from the feed chute prior to the time that the bucket actually has the desired amount of material therein. The auxiliary weight thus compensates for the material "in flight" at the time the flow of material is terminated and the final amount of material in the bucket is precisely equivalent to the magnitude of the counterpoise weight 5.

In the form of the invention as shown the weight of material "in flight" after the feed chute has closed is anticipated and counteracted by the auxiliary counterpoise. This counterpoise is shown in FIGURE 1 in its initial or neutral, generally vertical position, with the axis of the elongated member 11 concentric with or in the vertical plane of the axis of the weigh beam 1. In the use of the invention the feed chute is closed prior to the time that the desired weight of material is actually in the bucket. The apparatus and the method were developed essentially to eliminate trial and error and the inaccuracy of manual resetting. The user need not know the amount or weight of the material "in flight."

We claim:

1. In an automatic weighing machine wherein delivery of material to a weigh beam supported receptacle is automatically terminated by a predetermined movement of said receptacle, a weigh beam, a receptacle supported by one end of said weigh beam and a counterpoise of selected magnitude associated with the other end of said weigh beam, and an auxiliary weight structure associated with said weigh beam, said auxiliary weight structure including a screwthreaded elongated member pivoted coaxially with the axis of the weigh beam, a weight adjustable along said member, said member being movable along its axis, and a supplemental support on the weigh beam at each side of its axis, the permitted movement of the elongated member along its axis being sufficient to permit it to clear the outer ends of said supports, whereby the elongated member may be swung into a position above said supports, the parts being so proportioned that thereafter, when the elongated member has been moved along its axis in a retrograde direction in relation to its original movement, it may be swung into a supported relationship with either of said supports.

2. In an automatic net weighing machine, a weigh beam carrying a counterpoise and a container, and supported for movement on a pivot, said weigh beam being adapted for movement in response to a predetermined weight of material delivered to the container, means for delivering material to said container, means for automatically terminating the delivery of material in response to movement of said weigh beam, and means for compensating for material in flight at the time of termination of delivery including an auxiliary weight, means for normally supporting it in neutral position, means for adjusting it toward and away from the axis of the weigh beam, and means for supporting said auxiliary weight, alternatively in a position between such axis and the counterpoise, and in a position between the axis and the container, and means for transferring the auxiliary weight from one of said positions to the other without alteration of its adjustment whereby to provide, when desired, an identical auxiliary weight effect at either side of said axis.

3. In an automatic net weighing machine, a weigh beam carrying a counterpoise and a container, and supported for movement on a pivot, said weigh beam being adapted for movement in response to a predetermined weight of material delivered to the container, means for delivering material to said container, means for automatically terminating the delivery of material in response to movement of said weigh beam, and means for compensating for material in flight at the time of termination of delivery including an auxiliary weight, means for adjusting it toward and away from the axis of the weigh beam, and means for supporting said auxiliary weight, alternatively in a position between such axis and the counterpoise, and in a position between the axis and the container, and means for transferring the auxiliary weight from one of said positions to the other without alteration of its adjustment whereby to provide, when desired, an identical auxiliary weight effect at either side of said axis.

4. Apparatus for compensating for in-flight material in a fulcrumed beam weigher, said apparatus including in combination, a linearly adjustable compensating weight assembly, said compensating weight assembly including a weight carrier, a weight carried by the carrier, means for moving the weight relative to the carrier, said carrier being pivotable about an axis which lies in the vertical plane containing the weigh beam fulcrum, and means for supporting and positioning the weight compensating assembly to one side of the beam fulcrum at a position in which the weight of the compensating assembly counterbalances the weight of the in-flight material supported on the other side of the beam fulcrum, and means for supporting the weight compensating assembly in an identically corresponding position on the other side of the beam fulcrum without alternation of the relative position of the weight to the weight carrier.

5. The apparatus of claim 4 further characterized in that the weight compensating assembly is pivoted about an axis which is co-extensive with the fulcrum axis of the weigh beam.

6. In an automatic net weighing machine, a weigh beam carrying a counterpoise and supported for movement on a pivot, said weigh beam being adapted for movement in response to a predetermined weight of material delivered to a container carried by one end of said beam, and means for compensating for in-flight material delivered to the container on the second and all succeeding weighs, said means including adjustable auxiliary weight means selectively positionable and supportable at opposite sides of said pivot, and at an identical corresponding horizontal distance, without alteration of adjustment of the auxiliary weight means, to thereby compensate for the weight of material in flight at the time of shutoff of delivery of material to the container.

7. The structure of claim 6 further characterized in that the auxiliary weight is pivoted for rotation about the beam pivot.

8. The structure of claim 6 further characterized in that the auxiliary weight means includes a stem mounted for rotation about said pivot, a weight adjustable along the length of said stem, and supporting means for supporting said weight, when adjusted, selectively at either side of the pivot, with the weight at precisely the same horizontal distance from the pivot, on whichever side it is located.

References Cited by the Examiner
UNITED STATES PATENTS

| | | | |
|---|---|---|---|
| 536,334 | 3/95 | Gorringe | 177—115 |
| 687,855 | 12/01 | Roth | 177—190 |
| 831,164 | 9/06 | King | 177—190 |
| 838,503 | 12/06 | George | 177—68 |
| 1,663,129 | 3/28 | Hopkinson | 177—1 |
| 1,885,356 | 11/32 | Karrer | 177—1 |
| 2,348,372 | 5/44 | Weckerly | 177—107 |
| 2,650,791 | 9/53 | Adams | 177—114 |
| 2,781,993 | 2/57 | Magnuson | 177—1 |

FOREIGN PATENTS 235,825   6/25   Great Britain.

LEO SMILOW, *Primary Examiner.*

LEYLAND M. MARTIN, ROBERT L. EVANS,
*Examiners.*